June 21, 1949.   F. N. BARD   2,473,502
JOINT

Filed July 14, 1945   2 Sheets-Sheet 1

Inventor:
Francis N. Bard,
By Clinton, Wiles, Schroeder,
Merriam, & Hultgren, Attys.

June 21, 1949. F. N. BARD 2,473,502
JOINT
Filed July 14, 1945 2 Sheets-Sheet 2
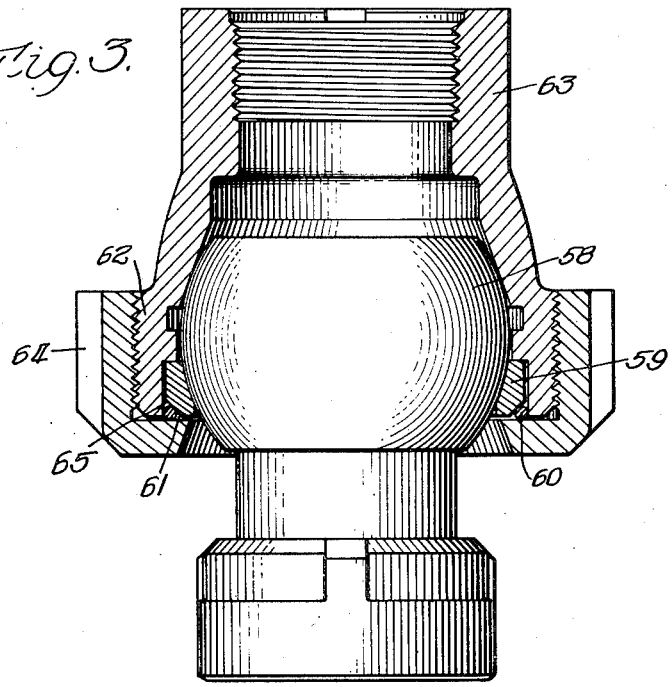
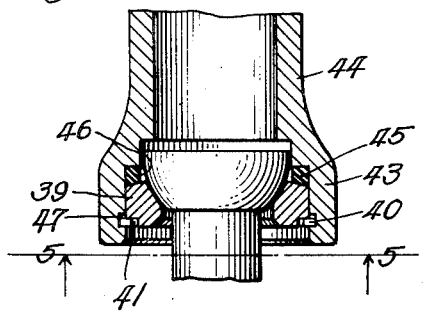
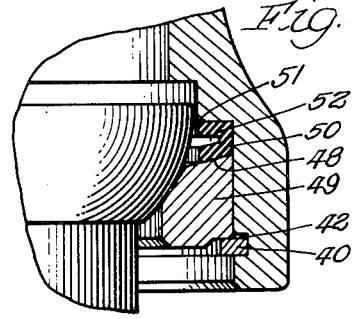
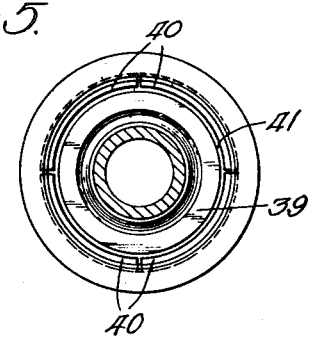
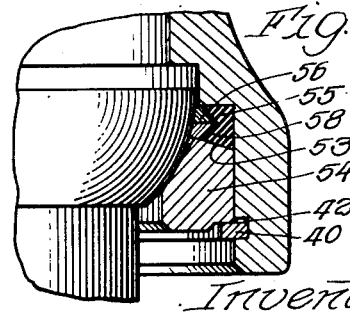
Inventor:
Francis N. Bard, Patented June 21, 1949

2,473,502

UNITED STATES PATENT OFFICE 2,473,502

JOINT

Francis N. Bard, Highland Park, Ill.

Application July 14, 1945, Serial No. 605,063

7 Claims. (Cl. 285—97.1)

This invention relates to a flexible joint and more particularly to a ball joint for use in fluid conduits where the fluid is subject to very high pressure such as 3000 lb. per square inch.

One feature of the invention is the provision of a novel sealing means for the joint comprising a gasket of metal or other suitable substance which fits slidingly or slightly loosely in its casing and a pliable ring of rubber or other suitable material adapted to fill in and seal any opening resulting from the loose fit. This permits rapid assembly of the joint and eliminates the need for lapping the gaskets into the casing, which is not only time consuming but never satisfactorily accomplishes the desired result of a leak proof seal at the very high pressure with which the present invention is concerned.

Another feature is the use of a metal gasket having a straight seat for the ball member thus eliminating the necessity for lapping a curved seat into each gasket for the ball with which it was to be used, no two balls being of exactly the same size. With the present invention the ball will wear itself into the gasket where the gasket is of material which is not as hard as the ball material.

A further feature is the provision of a novel dust seal for the gasket and the washer used to hold the gasket in place.

Other features and advantages of this invention will be apparent from the following specification and the drawings, in which:

Fig. 3 is a view partly in section of another construction embodying my invention;

Fig. 4 is a fragmentary view partly in section of another modified construction;

Fig. 5 is a view taken on the line 5—5 of Fig. 4;

Figs. 6 and 7 are enlarged fragmentary views partly in section of further modifications of the lower part of the joint shown in Fig. 4.

Figure 1:
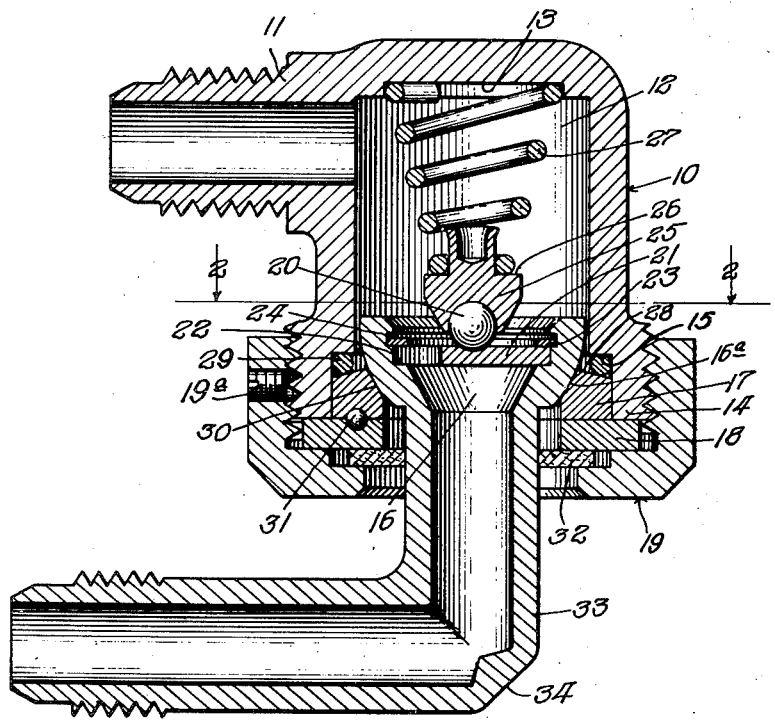
Fig. 1 is a vertical sectional view of a joint embodying my invention.
Figure 2:
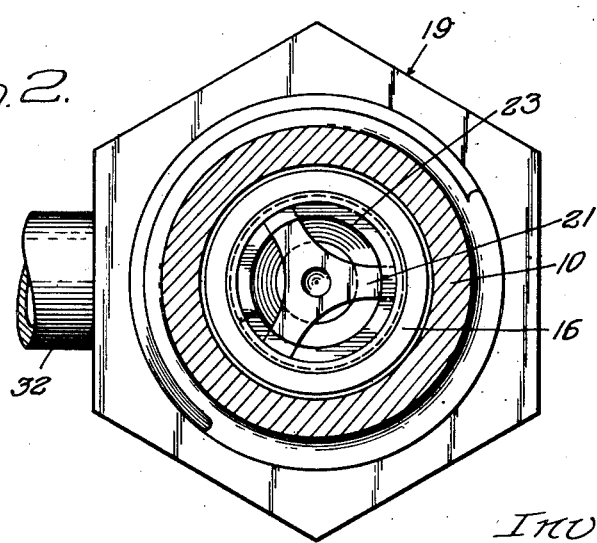
Fig. 2 is a horizontal sectional view taken on the line 2—2 of Fig. 1.

In the embodiment of the invention shown in Figures 1 and 2 of the drawings, 10 represents a casing having a neck 11 adapted to be threaded into a pipe or conduit section such as the brake fluid line of a large airplane where the fluid is subjected to very heavy pressure such as 3000 lbs. per square inch. The neck 11 leads to a chamber 12 having an annular well 13 in its closed end and an enlarged threaded open end 14 provided with a shoulder 15.

A ball member 16 having a substantially hemispherical outer surface 16a extends into the open end 14 of the casing where it is held in place by a five sided metal gasket 17 and a washer 18 in a nut 19 adapted to be threaded onto the end 14 of the casing and locked in place by a set screw 19a.

In order to retain the ball member in tight engagement with the gasket I provide a ball bearing member 20 in a spring seat support 21 comprising a spider mounted in an annular shoulder 22 of the ball member 16, said support being held in place by a snap ring 23 in an annular pocket 24 of the ball member 16. The ball bearing is also seated in a pressure member 25, the upper portion of which is reduced and provided with a shoulder 26 providing a seat for one end of a spring 27, the other end of which is adapted to be seated in the well 13 at the closed end of the casing chamber 12. It will be noted that the height of the pocket 24 is considerably greater than the thickness of the snap ring 23 so as to permit limited vertical movement of the spring seat support 21.

The upper surface 28 of the gasket tapers downwardly and when in position is spaced from the shoulder 15 in the casing thus leaving an annular space or chamber in which is a circular ring 29 of rubber or material similar thereto (hereinafter referred to as rubberlike) sometimes called an "O-ring," which is forced against the wall of the casing by the tapered surface of the gasket. The inner surface 30 of the gasket which contacts the outer surface of the ball member is flat, but at an angle, as shown. In order to prevent the gasket from turning with the ball member under the heavy pressures with which the device is used, I provide a ball 31 set in complementary holes or sockets in the gasket and retaining ring.

A shoulder is also provided near the open end of the nut to form a seat for a dust seal 32. The neck 33 of the ball member is bent at 34 and has a threaded end for attachment to another pipe or conduit section.

The construction provides a flexible leak proof joint. The ball and gasket connection permits a limited amount of movement between the parts and the rubber ring and gasket prevent any leakage. The pressure of the spring, plus the pressure of the fluid will force the ball member against the gasket to effect a complete seal at this point. The pressure of the fluid against the rubber ring will deform it and press it against the upper surface of the gasket and the adjacent inner side wall of the casing completely to seal any opening between the gasket and said side wall resulting from the gasket's sliding fit therein (as distinguished from the tight fit resulting from lapping the gasket into the casing as was formerly necessary).

The nut 19 and washer 18 may be of substantial thickness as they provide the base for the gasket against which the heavy pressure is exerted. In order to fit these parts in place they must pass around the bend in the neck and hence the openings in these parts must be substantially greater than the circumference of the neck 33. Furthermore, because of the flexibility of the joint there must be sufficient space between the neck and these parts to permit lateral movement of the neck. To protect the ball and its seat in the gasket from dust the dust seal 32 is provided. This seal is of stiff fibrous or other suitable substance and is relatively thin so that it may be passed around the bend in the neck and still have a close fit with the neck. The seat for this seal is of greater diameter than that of the seal and of slightly greater depth than the thickness thereof to permit the seal to move freely with the neck, yet always maintain an effective sealing contact for the neck.

In Figures 4 to 7 inclusive, of the drawings is disclosed an alternate support or retaining ring construction and alternate constructions of the circular ring. In these constructions the nut 19 is dispensed with and the gasket 39 seats or is supported on a four piece retaining ring which extends into a cut-out portion 41 in the outer end of the gasket and in turn seats in and is supported on an annular groove or depression 42 in the enlarged end 43 of the casing 44.

This construction not only eliminates the necessity for the nut 19 but permits the use of a metal ring which does not have to be stressed when inserted and hence the metal will be stronger and more reliable.

The joint is assembled by inserting the ball member, resilient ring and gasket in the casing and raising them upwardly until the sectional supporting ring can be slipped into the groove. Then the members are lowered until the gasket rests on the ring. The ring sections will be retained in place so long as any pressure is applied to them by the gasket as the distance between the end of the groove and the edge of the cut-out section is substantially the same as, or a little more than, the width of the ring sections. The ring sections being considerably wider than the depth of the cut-out section, the edge of the latter will retain the sections in the groove.

In Fig. 4 the circular ring 45 is of the same angular cross section as the outer side or end of the space or chamber 46 above the gasket 47. In Fig. 6 the upper side 48 of the gasket 49 slopes upwardly and the ring 50 is of the same angular cross section as the space or chamber 51, and is provided with a narrow V-shaped slit 52 in the side facing the ball member. In Fig. 7 the upper side 53 of the gasket 54 slopes downwardly and again the ring 55 is of the same cross section as the space or passage 56 which it occupies above the gasket 54 and is provided with a wide V-shaped slit 58. In each of these alternate constructions, the ring having the same cross section as the chamber in which it is located may, when deformed, more efficiently seal the sliding connection between the gasket and casing. The V-shaped slits are made for the same purpose, the pressure against the sides of the slits expanding the rings in all directions for said purpose.

In Fig. 3 is shown a device intended especially for even higher pressures, such as 6000 lbs. per sq. inch. In this construction the ball member 58 has a truncated spherical outer surface (more definitely the central segment of the sphere) and the gasket 59 is placed against the lower part of the surface where it rests on an O-ring 60 of soft metal, annealed copper or the like in an annular passage or chamber 61 of triangular cross section between the lower end 62 of the casing 63, a nut 64 threaded thereon, and the adjoining beveled surface 65 of the gasket. As initially fitted the ring is of sufficient thickness to space the gasket from the upper surface of the nut 64. Pressure of the ball against the gasket not only wears a complementary surface on its inner face but deforms the ring until it effectively seals the opening between the gasket and the inner surface of the lower end of the casing.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A flexible fluid conducting joint of the character described comprising a casing member having a cylindrical portion and a ball member received by said casing member and retained in movable sealing relationship therewith, including: a gasket of rigid material with a first surface having a sliding fit in said cylindrical portion of the casing and having a second surface contacting the outer surface of said ball member to oppose axial movement of the ball member due to fluid pressure in the joint, said gasket having a third surface extending closely adjacent the inner wall of the casing and making a corner therewith; a ring of deformable material pressed into the corner between the last mentioned surface and adjacent casing wall by fluid pressure in the joint for sealing the space between the casing and sliding gasket, said ring being on the side of said gasket open to fluid in the joint; and a removable support for said gasket.

2. A flexible fluid conducting joint of the character described comprising a casing member having a cylindrical portion and a ball member received by said casing member and retained in movable sealing relationship therewith, including: a gasket of rigid material with a first surface having a sliding fit in said cylindrical portion of the casing and having a second surface contacting the outer surface of said ball member to oppose axial movement of the ball member due to fluid pressure in the joint, said gasket having a third surface extending closely adjacent the inner wall of the cylindrical portion of the casing and making an acute angle therewith at an intermediate portion thereof providing a corner; a ring of deformable material pressed into the corner provided by the last mentioned surface and adjacent casing wall by fluid pressure in the joint for sealing the space between the casing and sliding gasket, said ring being on the side of said gasket open to fluid in the joint; and a removable support for said gasket.

3. A flexible fluid conducting joint of the character described comprising a casing member having a cylindrical portion and a ball member received by said casing member and retained in movable sealing relationship therewith, including: an annular gasket of rigid material having a generally pentagonal cross section with a first surface having a sliding fit in said cylindrical portion of the casing, a second surface contacting the outer surface of said ball member to oppose axial movement of the ball member due to fluid pressure in the joint, and an intermediate surface connecting said first and second surfaces and extending closely adjacent the inner wall of the cylindrical portion of the casing at an intermediate portion thereof providing a corner; a ring of deformable material pressed into the corner between said intermediate gasket surface and adjacent casing wall by fluid pressure in the joint for sealing the space between the casing and sliding gasket, said ring being on the side of said gasket open to fluid in the joint; and a removable support for said gasket.

4. In a flexible fluid conducting joint of the character described comprising a casing member and a necked ball member received by said casing member and retained in movable sealing relationship therewith, a dust seal comprising a relatively thin washer of stiff material, said washer having a central opening relatively closely embracing the neck of the ball member and having at least a portion of one surface in sliding engagement with a surface of the casing, whereby flexing of the joint causes limited angular movement between said washer and said neck and sliding movement of said washer with respect to said casing surface.

5. In a flexible fluid conducting joint of the character described comprising a casing member and a necked ball member received by said casing member and retained in movable sealing relationship therewith, a dust seal arrangement comprising a pair of spaced parallel confronting surfaces in one end of the casing providing an annular chamber and a relatively thin washer of stiff material, said washer having a central opening relatively closely embracing the neck of the ball member and having its opposite body surfaces in sliding engagement with said confronting casing surfaces, whereby flexing of the joint causes limited angular movement between said washer and said neck and sliding movement of said washer with respect to said casing surface.

6. Apparatus of the character claimed in claim 5, wherein said chamber and washer are both circular and the diameter of said chamber is substantially greater than that of said washer.

7. Apparatus of the character claimed in claim 5, wherein said washer is of fibrous material.

FRANCIS N. BARD.

REFERENCES CITED

The following references are of record in the file of this patent:

UNITED STATES PATENTS

| Number | Name | Date |
|---|---|---|
| 645,823 | Martin | Mar. 20, 1900 |
| 741,106 | Burdick | Oct. 13, 1903 |
| 887,753 | Beck | May 19, 1908 |
| 1,154,937 | Robertson | Sept. 28, 1915 |
| 1,436,331 | Ayling | Nov. 21, 1922 |
| 1,526,959 | Brownell | Feb. 17, 1925 |
| 1,671,975 | Aveling | June 5, 1928 |
| 2,076,028 | Hufferd | Apr. 6, 1937 |
| 2,095,728 | Bard | Oct. 12, 1937 |
| 2,158,131 | Laurent | May 16, 1939 |
| 2,377,196 | Walley | May 29, 1945 |

FOREIGN PATENTS

| Number | Country | Date |
|---|---|---|
| 497,482 | Germany | Apr. 17, 1930 |